(12) United States Patent
Nagao

(10) Patent No.: US 6,573,909 B1
(45) Date of Patent: Jun. 3, 2003

(54) MULTI-MEDIA DISPLAY SYSTEM

(75) Inventor: Kagenori Nagao, Zama (JP)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/485,213

(22) PCT Filed: Nov. 8, 1998

(86) PCT No.: PCT/US98/16636

§ 371 (c)(1),
(2), (4) Date: Feb. 4, 2000

(87) PCT Pub. No.: WO99/08180

PCT Pub. Date: Feb. 18, 1999

(30) Foreign Application Priority Data

Aug. 12, 1997 (JP) ............................................. 9-217281

(51) Int. Cl.$^7$ ................................................ G09G 5/00
(52) U.S. Cl. .......................... 345/727; 345/978; 84/622
(58) Field of Search ........................ 345/978; 705/727; 84/622, 625, 660

(56) References Cited

U.S. PATENT DOCUMENTS 5,027,689 A * 7/1991 Fujimori ........................ 38/63
5,802,187 A * 9/1998 Hsu ............................ 327/172

OTHER PUBLICATIONS

"Applications for Digital Video System—Programming with Video for Windows 1.1", Bootstrap Project-3 No. 5, Sep. 1, 1994, pp. 60–61.

Richard J. Simon et al, "API File Input/Output", Windows 95 API Bible 3—ODBC, Multimedia, May 10, 1997, pp. 829–831.

"BITMAPINFOR Structure" "BITMAPINFOHEADER Structure", Microsoft (R) Visual Studio (TM) 97, Microsoft Visual C++5.0 on–line help information, pp. 1–2.

"The Virtual Reality Modeling Language 5. Node Reference", Version 20, ISO/IEC CD 14772, Aug. 4, 1996, pp. 1–3.

* cited by examiner

*Primary Examiner*—John Cabeca
*Assistant Examiner*—Brian J Detwiler

(57) ABSTRACT

A display system for performing a multi-media work that includes image data and sound data associated with the image data. The system includes a display for displaying an image derived from said image data, an audio playback system for combining and playing first and second audio tracks, and a pointing system for selecting a region of the image on the display in response to commands from a user of the display system. The system also includes a playback processor for altering the combination of the first and second audio tracks played by the audio playback system in response to the pointing system selecting a new region. The playback processor also alters the display such that the portion of the image selected by the pointing system is centered in the display.

16 Claims, 4 Drawing Sheets

MULTI-MEDIA DISPLAY SYSTEM

This application is a national stage entry of PCT/US98/16636, International Filing Date: Nov. 8, 1998.

FIELD OF THE INVENTION

The present invention relates to display systems for playing multi-media works, and more particularly, to a sound processing system that alters a sound track in response to the cropping of an image associated with the sound track.

BACKGROUND OF THE INVENTION

Multi-media works consisting of still or moving images with narration, background sounds, and background music are becoming common. Such works may be found on the Internet or on CD-ROM. Systems for displaying motion pictures with sound on computers and other data processing systems are also common utilizing programs such as VIDEO FOR WINDOWS to reproduce the work on computers. Furthermore, 3-dimensional modeling of sound can be specified in VRML 2.0. In a VRML 2.0 compliant browser, the sound generated by the components of a scene are specified by providing separate sound tracks for each sound source together with the location of that sound source in the scene. The sound observed by a listener facing any direction at any position relative to the sound source can then be reproduced by combining the individual sound sources.

Unlike fixed display systems, computer-based display systems allow the viewer to crop, enlarge, and display a portion of a digital image, scroll the enlarged image, and display the enlarged image in another cropping frame. However, for either a still image or a moving image, prior art audio data processing systems do not alter the sound tracks in response to the alterations in the image being displayed. In general, the same sounds are reproduced independent of the cropping frame chosen by the user. VIDEO FOR WINDOWS does not provide the ability to crop the motion picture image and to display the cropped image on the screen. For that reason, a conventional AVI file, which is motion picture file used by VIDEO FOR WINDOWS, normally does not include data for controlling multiple audio streams in response to the position of a cropping frame in the motion picture image. Therefore, if the video stream is associated with multiple audio streams, a conventional program such as VIDEO FOR WINDOWS lacks the ability control the audio signals decoded from the multiple audio streams in response to the user defining the position of a cropping frame in the motion picture image.

While VRML 2.0 provides the data needed to generate a sound track corresponding to the point of view of the user thereby creating a 3-dimensional sound image that can be changed in response to cropping, etc., systems implementing VRML 2.0 do not alter the "sound image" in response to changes in the visual image. Furthermore, the sound model implemented by VRML 2.0 is customized to implement 3-dimensional sound effects, and is poorly suited for applications that process audio data linked to 2-dimensional images. Therefore, none of the existing programs can automatically control the audio to match the user's definition of a cropping frame in the motion picture image.

Broadly, it is the object of the present invention to provide an improved audio processing system for use with multi-media works.

It is a further object of the present invention to provide an audio processing system that alters the audio playback in response to changes in the scene selected by the user.

These and other objects of the present invention will become apparent to those skilled in the art from the following detailed description of the invention and the accompanying drawings.

SUMMARY OF THE INVENTION

The present invention is a display system for performing a multi-media work that includes image data representing a still or moving image, and sound data associated with the image data. The system includes a display for displaying an image derived from the image data, an audio playback system for combining and playing first and second audio tracks linked to the image, and a pointing system for selecting a region of the image on the display in response to commands from a user of the display system. The system also includes a playback processor for altering the combination of the first and second audio tracks played by the audio playback system in response to the pointing system selecting a new region of the image. The playback processor also alters the display such that the portion of the image selected by the pointing system is centered in the display. In one embodiment of the invention, the first and second audio tracks include sound tracks to be mixed prior to playback. In this embodiment, the image includes data specifying gains to be used in the mixing for the sound tracks when the selected region of the display is centered at predetermined locations in the image. If the predetermined locations do not include the center of the selected region, the playback system interpolates the data for the predetermined locations to provide the gains to be used in mixing the sound tracks. In another embodiment of the invention, the multi-media work includes data for specifying images at multiple resolutions. In this embodiment, the pointing system further selects one of the resolutions in response to input from the user, The playback processor then alters the combination of the first and second audio tracks played be the audio playback system in response to both the selected region and the selected resolution.

The invention is also a method for operating a data processing system during the playback of a multi-media work comprising image data and sound data associated with the image data. In the method, an image derived from the image data is displayed. First and second audio tracks linked to the image are combined and placed. Data are received from a user selecting a region of the displaced image. In response to the received data, the selected region of the displayed image is displaced centered and the combination of the first and second audio tracks is altered.

DETAILED DESCRIPTION OF THE INVENTION

Figure 1:
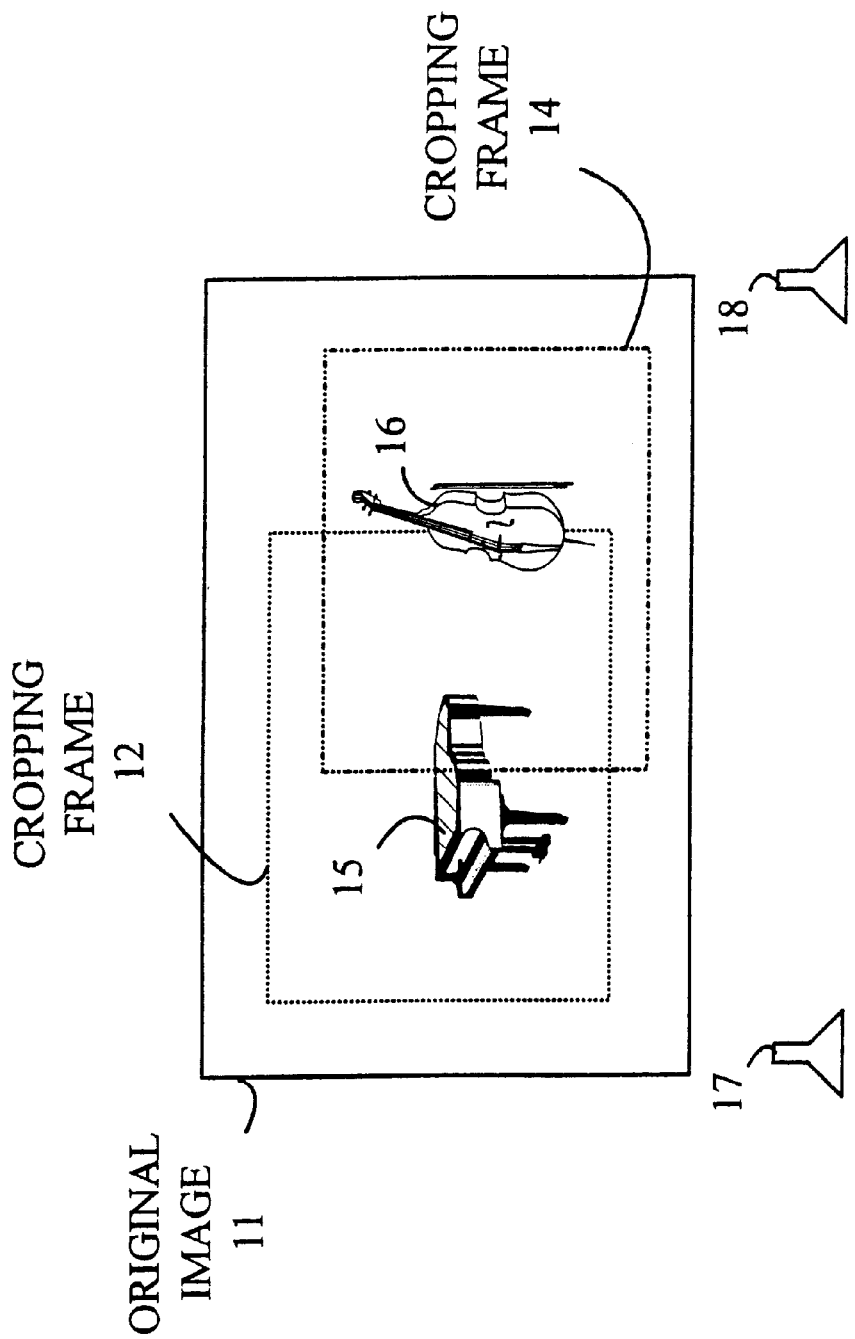
FIG. 1 illustrates a simple multi-media display.

The manner in which the present invention gains its advantages may be more easily understood with reference to FIG. 1 which illustrates a simple multi-media display. The display consists of an image 11 of a piano 15 and a bass 16 and a sound track of a musical work generated by the two instruments. The sound track is played through a stereo sound system consisting of speakers 17 and 18. The stereo sound track is constructed from two audio tracks, one for the piano and one for the bass. Each audio track has right and left hand components which are mixed to generate the signals sent to speakers 17 and 18. The mixing of the signals consistent with image 11 generates an "acoustical image" in which the piano appears to be located closer to speaker 17, and the bass appears to be located closer to speaker 18.

Many playback systems allow the user to zoom into various portions of the display by defining a cropping frame around the desired portion. The cropped image is then re-displayed in its own frame. In some systems, the cropped image is enlarged to fill the original frame. As noted above, prior art systems do not alter the acoustical image to take into account the new visual image. As a result, the cropped image shown in cropping frame 12 would have an acoustical image in which piano 15 still appears to be located at the same position in the cropped frame as it occupied in the original frame. That is, piano 15 still appears to be closer to speaker 17 even though it is now in the middle of the new frame. This inconsistency in the acoustical and visual images is distracting to human observers.

The present invention overcomes this problem with prior art displays by altering the acoustical image in response to the cropping of the original image. Hence, in the present invention, when the user defines a cropping frame such as frame 14, the sound tracks are re-mixed such that the apparent sound sources are likewise shifted in position in the acoustical image. Accordingly, in the present invention, the sound of the bass would be moved such that it was equidistant between speakers 17 and 18 when the viewing frame is switched from the original frame 11 to that shown in cropped frame 14.

Figure 2:
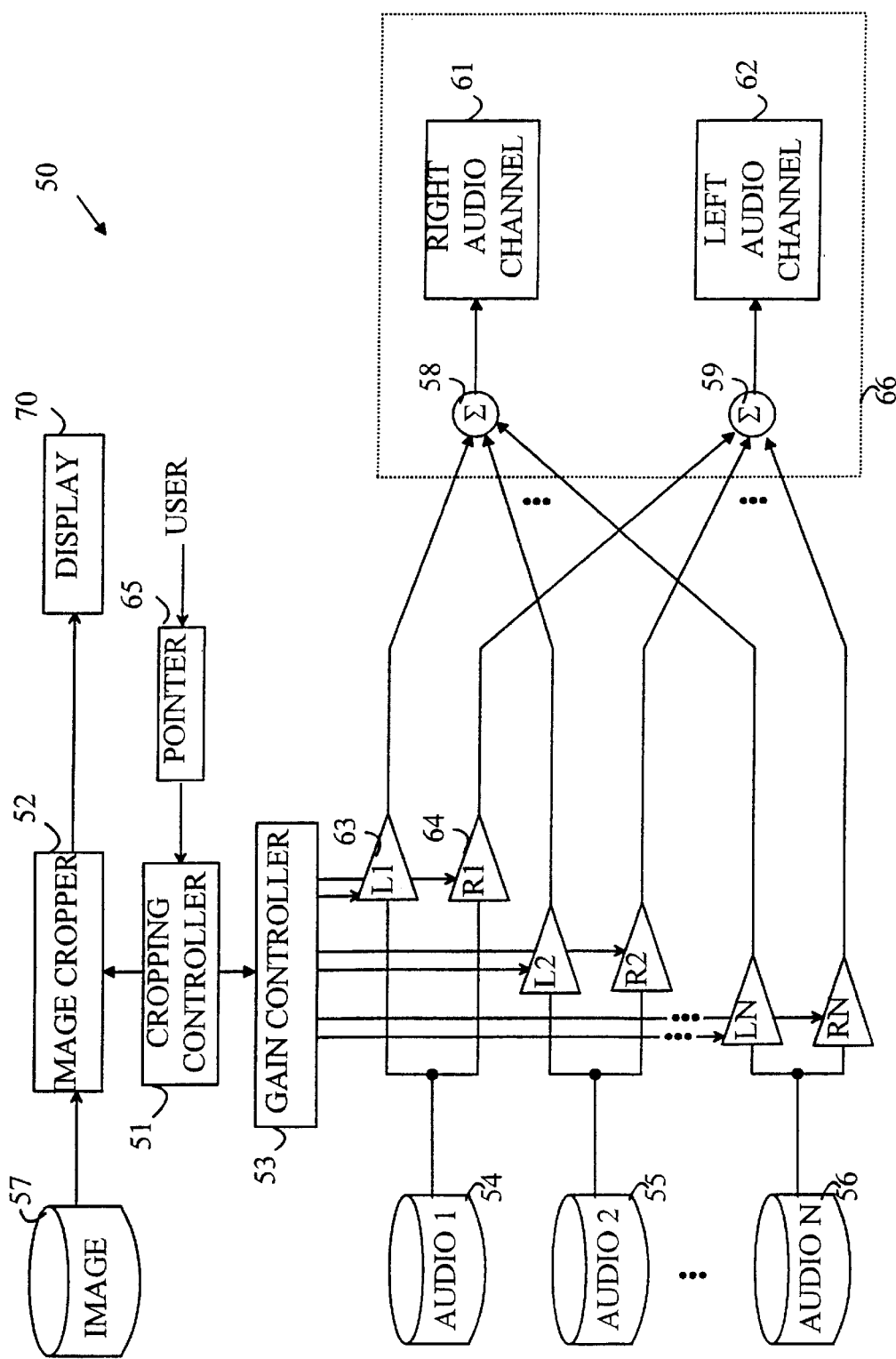
FIG. 2 is a schematic drawing of an image display system according to one embodiment of the present invention.

Refer now to FIG. 2, which is a schematic drawing of an image display system 50 according to one embodiment of the present invention. In this embodiment, the user specifies a cropping frame using, for example, a pointer 65 applied to image data 57 that is displayed on display 70. The cropped image boundary is input via a cropping controller 51 which sends the limits of the new frame to the appropriate cropping routine 52 in the display system. The new image boundaries are also sent to a gain controller 53, which controls the mixing of the right and left speaker signal components generated for each audio track. In this embodiment of the invention, the audio tracks are separately processed and then mixed in the playback system 66 via summing amplifiers 58 and 59 to provide the final left and right signals that are sent to the right and left audio channels, 61 and 62, of the stereo system. Exemplary audio tracks are shown at 54–56. Each audio track includes left and right components whose relative gain is determined by the gain settings applied to a corresponding pair of amplifiers. The amplifiers corresponding to audio track 54 are shown at 63 and 64. By adjusting the relative gains of the left and right hand audio tracks, the apparent location of the acoustical image for that track within the frame can be moved from side to side. In the embodiment shown in FIG. 2, there are N such audio tracks corresponding to N acoustical sources within the scene.

In the simple image shown in FIG. 1, only two of these audio tracks are present, one for the piano and one for the bass. Consider the image in cropping frame 12. Since the piano image is displayed near the center and the bass image is displayed on the right side, the stereo orientation of the sounds of both instruments must be altered such that the piano sounds appear to come from a location near the center, and the bass sounds appear to come from a location to the far right. Therefore, (R1, L1) and (R2, L2) in FIG. 2 are controlled by the gain controller such that, for example, the relative gains of the left and right channels are now (R1, L1)=(0.5, 0.5) and (R2, L2)=(1.0, 0.0).

If the display position of the image is changed to cropping frame 14 by instructions from the user, the piano image will now be displayed on the left side and the bass near the center of the image. Accordingly, the gain controller must shift the relative gains such that, for example, (R1, L1)=(0.0, 1.0) and (R2, L2)=(0.5, 0.5).

In this embodiment of the present invention, the sound track attributes of each source are specified for each pixel at position (x, y) in the image. For example, the information stored for each pixel, P(x,y) could include the left and right channel gains for each audio track in addition to the image pixel value v, i.e., $$P(x, y)=(v, R1, L1, R2, L2) \qquad (1)$$

When the image is cropped such that the center of the cropped image differs from that of the uncropped image, the data from Eq. (1) for the pixel that is now at the center of the display can then be used to recompute the audio attributes by altering the relative mixing of each sound track in accordance with location of the sound source for that sound track within the new frame created by cropping the old frame.

The teachings of the present invention may also be applied to multi-resolution images. For the purposes of this discussion, a multi-resolution image is defined to be an image that can be viewed at two or more different magnifications. Such an image may be specified by a zoom setting. To zoom into the image, i.e., increase the magnification, the user can point to a specific location in the image. The display system then selects the region centered at the new position at the next highest resolution level to fill the display area. In effect, the display system crops the next highest resolution image at the boundaries of the display window. A zoom operation may alter the effective position of the viewer with respect to the image both in terms of left-right alignment and distance. Hence, both the volume of the various audio tracks and the relative gains of the right and left channels must be adjusted to provide a realistic sound track when the image is zoomed. The data needed to re-compute the left-right balance and amplitude for each audio source may be specified by specifying the gains for each of the left-right amplifiers at the various resolutions. That is, the attribute P(x, y, r) of the pixels in resolution layer r and position (x, y) is defined to include the channel amplifications to be used when the pixel at (x, y) becomes the center of the scene, i.e., $$P(x, y, r)=(v, R1, L1, R2, L2, \ldots, Rn, Ln) \qquad (2)$$

Referring again to the example in FIG. 1, when the cropping frame is set to frame 14 and the image redisplayed in the original frame, the bass portion is enlarged as well as moved to the center of the frame. In this case, the sound of the bass is substantially increased. If the new frame completely eliminated the piano, only the sound of the bass audio track would be played in some embodiments of the present invention. That is, the piano audio track would be attenuated to zero. However, it will be obvious to those skilled in the art from the preceding discussion that embodiments in which the piano track was still present at an attenuated level could also be practiced without deviating from the teachings of the present invention.

The teachings of the present invention may also be applied to moving pictures. In this case, the multi-media work includes image data representing a moving image that includes a sequence of frames. The above described methods may be applied frame by frame by including the sound values for each pixel in each frame of the moving picture so that the audio tracks can be adjusted when that pixel becomes the center of the frame, i.e., for the pixel at (x,y) in frame f, $$P(x, y, f) = (v, R1, L1, R2, L2, \ldots, Rn, Ln) \quad (3)$$

Here, v is the image pixel value for the relevant pixel in the image, and R1, L1, R2, L2, ..., Rn, Ln are the left and right channel gains for audio sources 1 to n, respectively. Accordingly, the stereo orientation can be changed over time in response to a change in the viewing area.

In the case of a multi-resolution moving picture, audio channel amplitudes for the various resolution layers may be stored for each frame to allow the relative volumes of the audio sources to be adjusted in time with changes in the visual viewing field specified by zooming in or out. In this case, $$P(x, y, f, r) = (v, R1, L1, R2, L2, \ldots, Rn, Ln) \quad (3\text{-}1)$$

Figure 3:
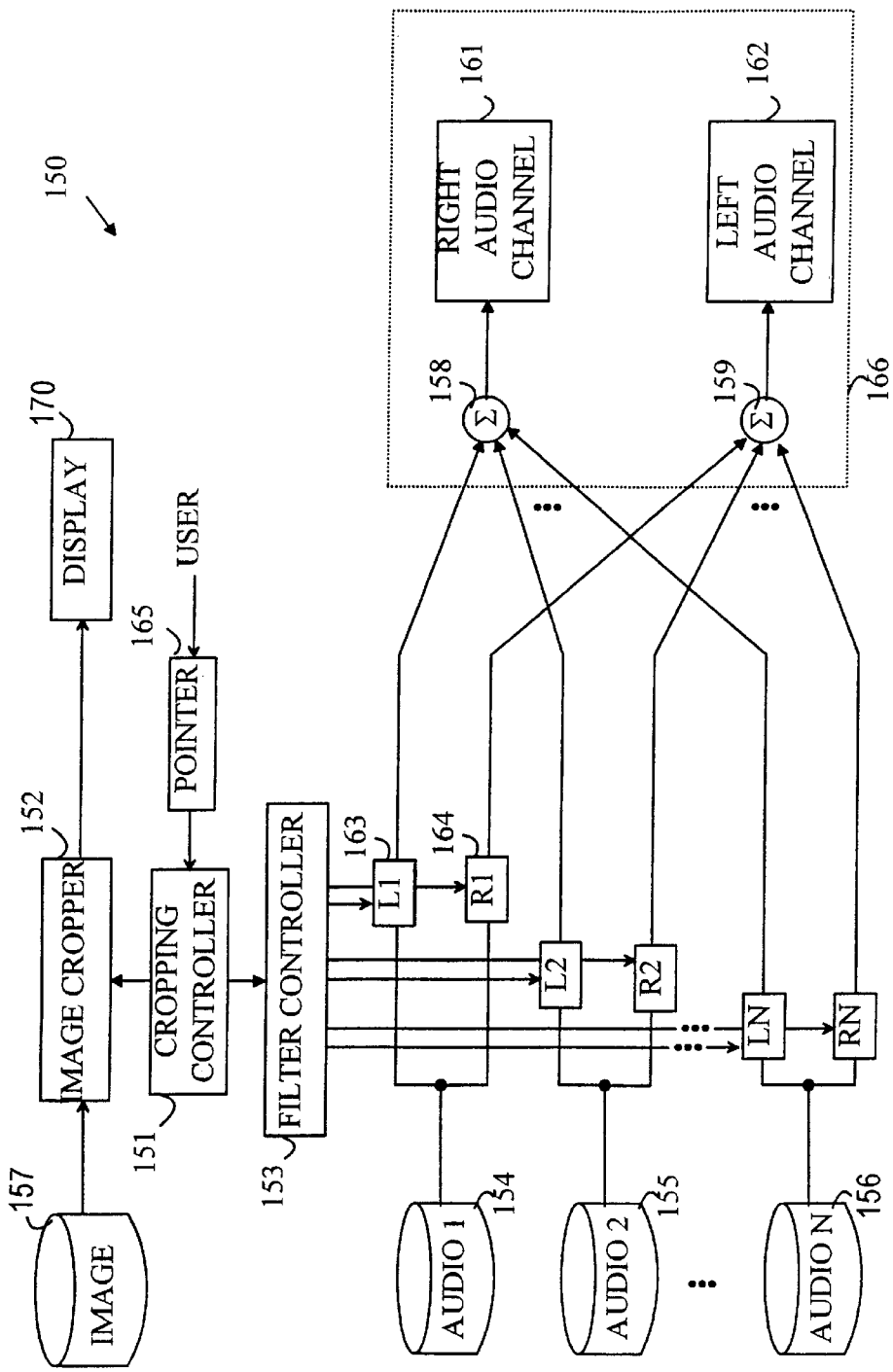
FIG. 3 is a block diagram of a sound and image processing system according to another embodiment of the present invention.

While the above-described embodiments of the present invention have utilized amplifiers to process the audio tracks, it will be obvious to those skilled in the art from the preceding discussion that other processors may be utilized. It is well known in the sound image processing arts that the apparent location of a sound source in a sound image can be altered by filtering the digitized sound tracks. Refer now to FIG. 3, which is a block diagram of a sound and image processing system 150 according to another embodiment of the present invention. To simplify the following discussion, elements of system 150 which serve analogous functions to elements shown in FIG. 2 have been given reference numerals that differ by 100 from those used for the analogous functioning elements in FIG. 2. In system 150, the user again specifies a region of the image for cropping or zooming. The information on the new scene is converted by filter controller 153 into a set of filter coefficients that are applied to the relevant sound tracks by digital filters. Exemplary digital filters are shown at 163 and 164. Each digital filter coefficient changes in relation to the (x, y) coordinates of the center of the cropping region, the resolution layer, r, and the moving image frame and position.

By using digital filters, more complex alterations in the sound tracks can be achieved. For example, the music tracks in a scene of a concert hall can be altered to include echoes that are altered as the scene is zoomed in or out thereby producing a more realistic sound track. Further, the processing can be customized for either binaural recording in which the sound is played back through headphones or transaural playback in which the sound is played back through stereo speakers but not headphones. In either case, the source of the sound is modified to correspond to the correct location in the modified display selected by the user.

The above-described embodiments of the present invention have utilized multi-media data in which all of the sound attributes have been supplied for all of the pixels so that the correct sound attributes could be accessed when any given pixel became the center of the display. However, it will be obvious to those skilled in the art from the preceding discussion that systems in which the sound data to be used when any specific pixel becomes the center of the display may be computed from the sound data for a subset of the pixels.

Figure 4:
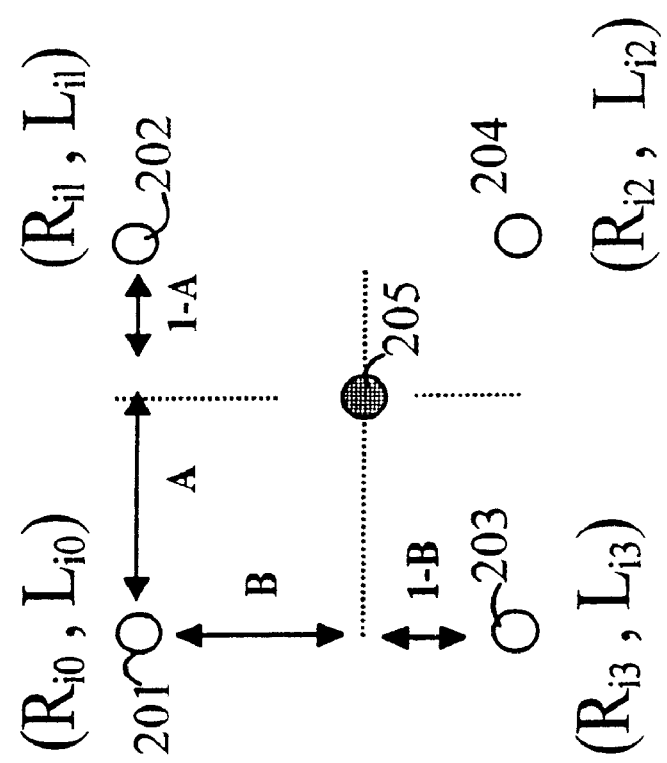
FIG. 4 illustrates the interpolation of the sound processing parameters stored for selected pixels in an image to obtain new sound processing parameters.

For example, if the left and right channel gains of each audio data are given as the P(x, y) elements described above when the coordinate at the center of the cropping region is (x, y) for specific points as shown in FIG. 4 at 201–204, the left and right channel gains for a cropped frame having a center as shown at 205 may be obtained from values stored for points 201–204 by interpolating the values shown for points 201–204.

$$(R_i(x_c,y_c), L_i(x_c,y_c)) = (1-A)(1-B)(R_{i0}, L_{i0}) + A(1-B)(R_{i1}, L_{i1}) + AB(R_{i2}, L_{i2}) + (1-A)B(R_{i3}, L_{i3}) \quad (4)$$

where $(R_i(x_c,y_c), L_i(x_c, y_c))$ are the left and right channel gains for the $i^{th}$ sound track when the center position of the image cropping region is at $(x_c, y_c)$, and $(R_{ij}, L_{ij})$ are the left and right channel gains of the $i^{th}$ element of sound track data when the center position of the image cropping region is at the $j^{th}$ reference point. Here, A and B are the ratios of the center position of the image cropping region internally divided by the width and height of the rectangular region defined by the four reference points shown in FIG. 4, i.e., $0 \leq A, B \leq 1$.

While the example shown in FIG. 4 utilizes 4 reference points, it will be obvious to those skilled in the art from the preceding discussion that other numbers of reference points may be utilized. If for example, only correction in the left and right positioning of the sound images are to be made, only two reference points are needed. Similarly, a larger number of reference points may be included if the results of the simple linear interpolation discussed above are not satisfactory. In this case, the subset of the reference points nearest the new center position are interpolated. Alternatively, the additional reference points may be utilized with a higher order interpolation algorithm.

The interpolation methods described above have been described in terms of a fixed resolution, non-moving image. However, it will be obvious to those skilled in the art from the preceding discussion that similar methods can be applied to multi-resolution images and moving pictures since these types of images may be viewed as a collection of single resolution, non-moving images. Hence, if reference points are included in each of the single resolution images, the relevant data can be interpolated at the single resolution, non-moving image level. It will also be apparent that, in the case of a moving picture, reference points may be omitted for some frames altogether. In this case, the reference points for the missing frames may be obtained by interpolating the reference points provided for specific frames on each side of the frame in question.

While the present invention has been described in terms of a display system, it will be obvious to those skilled in the art from the preceding discussion that the present invention may be practiced on any general purpose data processing system equipped to playback a multi-media work. In this case, the present invention can be implement by altering the playback routines to provide the various user input function and mixing functions described above with reference to the display system embodiments of the invention.

Various modifications to the present invention will become apparent to those skilled in the art from the foregoing description and accompanying drawings. Accordingly, the present invention is to be limited solely by the scope of the following claims.

What is claimed is:

1. A display system for playing a multi-media work comprising image data and sound data associated with said image data, said system comprising:

a display for displaying an image derived from said image data;

an audio playback system for combining and playing first and second audio tracks linked to said image;

a pointing system for selecting a region of said image on said display, said selected region being specified by commands from a user of said display system; and a playback processor for altering the combination of said first and second audio tracks played by said audio playback system in response to said pointing system selecting a new region on said display and for displaying said new region centered in said display.

2. The display system of claim 1 wherein said first and second audio tracks comprise sound tracks to be mixed prior to playback, and wherein said image includes data specifying gains to be used in said mixing when said selected region of said display is centered at predetermined locations in said image.

3. The display system of claim 2 wherein said playback processor comprises an interpolation processor for interpolating said data for said predetermined locations to provide gains for said sound tracks when said selected region is centered at a point that differs from said predetermined locations.

4. The display system of claim 3 wherein said multi-media work comprises data for specifying images at multiple resolutions, wherein said pointing system further selects one of said resolutions in response to input from said user, and wherein said playback processor alters said combination of said first and second audio tracks played by said audio playback system in response to both said selected region and said selected resolution.

5. The display system of claim 4 wherein said image includes data specifying gains to be used in said mixing for said sound tracks when said selected region of said display is centered at predetermined locations in said image and at predetermined resolutions.

6. The display system of claim 5 wherein said interpolation processor interpolates said data for said predetermined locations and resolutions to provide gains for said sound tracks when said selected region is centered at a point that differs from said predetermined locations and resolutions.

7. The display system of claim 1 wherein said playback processor comprises a variable gain amplifier for each of said audio tracks, the gain of said amplifier being set in response to a change in said selected region of said image.

8. The display system of claim 1 wherein said playback processor comprises a filter for each of said audio tracks, each of filters being controlled by filter coefficients input thereto, and wherein said playback processor, alters said filter coefficients in response to a change in said selected region.

9. A method for operating a data processing system during the playback of a multi-media work comprising image data and sound data associated with said image data, said method comprising the steps of:

displaying an image derived from said image data;

combining and playing first and second audio tracks linked to said image;

receiving data from a user selecting a region of said displayed image; and displaying said selected region centered and altering the combination of said first and second audio tracks in response to said received data.

10. The method of claim 9 wherein said first and second audio tracks comprise sound tracks to be mixed prior to playback, and wherein said image includes data specifying gains to be used in said mixing when said selected region of said display is centered at predetermined locations in said image.

11. The method of claim 10 wherein altering the combination of said first and second audio tracks comprises interpolating said data for said predetermined locations to provide gains for said sound tracks when said selected region is centered at a point that differs from said predetermined locations.

12. The method of claim 11 wherein said multi-media work comprises data for specifying images at multiple resolutions, wherein said received data further specifies one of said resolutions, and wherein said combination of said first and second audio tracks depends on both said selected region and said selected resolution.

13. The method of claim 12 wherein said image data includes data specifying gains to be used in said mixing for said sound tracks when said selected region is centered at predetermined locations in said image and at predetermined resolutions.

14. The method of claim 13 further comprising the step of interpolating said data for said predetermined locations and resolutions to provide gains for said sound tracks when said selected region is centered at a point that differs from said predetermined locations and resolutions.

15. The method of claim 9 wherein said step of combining said audio tracks comprises altering the gain for each of said audio tracks, the gain of said audio tracks being set in response to a change in said selected region of said image.

16. The method of claim 9 wherein said step of combining said audio tracks comprises applying a filter to each of said audio tracks, each of said filters being controlled by filter coefficients that change in response to a change in said selected region.

* * * * *